US012191915B1

(12) United States Patent
Lakshmikumar et al.

(10) Patent No.: US 12,191,915 B1
(45) Date of Patent: Jan. 7, 2025

(54) DIFFERENTIAL DIFFERENCING TRANSIMPEDANCE AMPLIFIER FOR COHERENT APPLICATIONS

(71) Applicant: Cisco Technology, Inc., San Jose, CA (US)

(72) Inventors: Kadaba Lakshmikumar, Hillsborough, NJ (US); Romesh Kumar Nandwana, Breinigsville, PA (US); Alexander C. Kurylak, Nazareth, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 228 days.

(21) Appl. No.: 17/689,634

(22) Filed: Mar. 8, 2022

(51) Int. Cl.
*H04B 10/60* (2013.01)
*H04B 10/61* (2013.01)
*H04B 10/69* (2013.01)

(52) U.S. Cl.
CPC ......... *H04B 10/616* (2013.01); *H04B 10/613* (2013.01); *H04B 10/614* (2013.01);
(Continued)

(58) Field of Classification Search
CPC .. H04B 10/616; H04B 10/613; H04B 10/614; H04B 10/60; H04B 10/61; H04B 10/69;
(Continued)

(56) References Cited

U.S. PATENT DOCUMENTS 6,064,507 A * 5/2000 Heflinger ............... H04B 10/69
398/1
6,552,605 B1 * 4/2003 Yoon ....................... H03F 3/505
330/99

(Continued)

FOREIGN PATENT DOCUMENTS

JP 2016025513 A 2/2016

OTHER PUBLICATIONS

Semjon Schaefer, et al., "Coherent receiver design based on digital signal processing in optical high-speed intersatellite links with M-phase-shift keying," Optical Engineering, SPIE, vol. 55, Nov. 2016, 13 pages.
(Continued)

*Primary Examiner* — Dibson J Sanchez
(74) *Attorney, Agent, or Firm* — Edell, Shapiro & Finnan, LLC

(57) ABSTRACT

Techniques for implementing a differential differencing TIA for coherent applications are disclosed. A method includes receiving first and second optical signals from a 90 degree optical hybrid that receives a coherent optical signal, wherein the first and second optical signals each include one pair of sum and difference signals output by the 90 degree optical hybrid, generating, based on the first optical signal and from a first photo diode, a first differential signal, generating, based on the second optical signal and from a second photo diode, a second differential signal, differentially transconducting the first and second differential signals to produce first and second transconducted signals, performing a differencing operation on the first and second differential transconducted signals to produce a combined differential-differencing transconducted signal that is representative of the first optical signal and the second optical signal, and outputting the combined differential transconducted signal as a differential output.

20 Claims, 11 Drawing Sheets

(52) U.S. Cl.
CPC .............. *H04B 10/60* (2013.01); *H04B 10/61* (2013.01); *H04B 10/69* (2013.01); *H04B 10/693* (2013.01); *H04B 10/6931* (2013.01); *H04B 10/6933* (2013.01)

(58) Field of Classification Search
CPC .............. H04B 10/693; H04B 10/6931; H04B 10/6933
USPC .................................. 398/104–105, 202–214
See application file for complete search history.

(56) References Cited

U.S. PATENT DOCUMENTS

| | | | | |
|---|---|---|---|---|
| 6,781,468 | B1* | 8/2004 | Robinson | H03F 1/565 330/308 |
| 8,471,639 | B2 | 6/2013 | Welch | |
| 8,878,570 | B2* | 11/2014 | Thomsen | H03K 5/00 327/63 |
| 10,020,784 | B1* | 7/2018 | Christensen | H03F 1/083 |
| 10,250,207 | B2 | 4/2019 | Welch | |
| 10,348,257 | B2 | 7/2019 | Welch | |
| 11,489,590 | B1* | 11/2022 | Leykauf | H04B 10/615 |
| 2001/0050333 | A1* | 12/2001 | Feng | H03F 3/087 250/214 A |
| 2004/0121735 | A1* | 6/2004 | Tseng | H03F 3/45973 455/75 |
| 2008/0240325 | A1* | 10/2008 | Agazzi | H04L 7/0083 375/371 |
| 2008/0240735 | A1* | 10/2008 | Bossard | H03F 1/08 398/202 |
| 2013/0236172 | A1* | 9/2013 | Suzuki | H04B 10/615 398/43 |
| 2013/0336665 | A1 | 12/2013 | Suzuki | |
| 2014/0112626 | A1* | 4/2014 | Galloway | H05K 1/0245 29/831 |
| 2014/0348515 | A1* | 11/2014 | Tsubouchi | H04B 10/614 398/202 |
| 2015/0086221 | A1* | 3/2015 | Shringarpure | H03F 1/0205 359/344 |
| 2015/0295660 | A1 | 10/2015 | Suzuki | |
| 2016/0119064 | A1* | 4/2016 | Yamaji | H04B 10/40 385/33 |
| 2016/0164624 | A1* | 6/2016 | Yamauchi | H04B 10/616 398/34 |
| 2016/0226595 | A1 | 8/2016 | Duthel et al. | |
| 2016/0285561 | A1* | 9/2016 | Wu | H04B 10/613 |
| 2017/0126315 | A1* | 5/2017 | Saito | H04B 10/572 |
| 2017/0134097 | A1* | 5/2017 | Morie | H04B 10/61 |
| 2017/0141853 | A1* | 5/2017 | Welch | H04B 10/693 |
| 2019/0173588 | A1* | 6/2019 | Ahmed | H04B 10/693 |
| 2019/0260476 | A1* | 8/2019 | Shen | H04B 10/615 |
| 2020/0091881 | A1* | 3/2020 | Lim | H03F 3/45475 |
| 2020/0228077 | A1* | 7/2020 | Harris | H03F 3/087 |
| 2020/0235819 | A1* | 7/2020 | Goebuchi | H04B 10/61 |
| 2021/0167863 | A1* | 6/2021 | Sugimoto | H03F 3/45475 |
| 2022/0057262 | A1* | 2/2022 | Kumagai | H03F 3/08 |

OTHER PUBLICATIONS

Mostafa G. Ahmed, et al., "Transimpedance Amplifier for 200-GB/s DP-16-QAM Optical Coherent Receivers," IEEE Journal of Solid-State Circuits, vol. 54, No. 3, Mar. 2019, 11 pages.

Joris Lambrecht, et al., "56-GB/s Silicon Optical Receiver using a Low-Noise Fully-Differential Transimpedance Amplifier in SiGe BiCMOS," IEEE, Sep. 2018, 3 pages.

Joris Lambrecht, et al., "90-GB/s NRZ Optical Receiver in Silicon Using a Fully Differential Transimpedance Amplifier," IEEE, Journal of Lightwave Technology, vol. 37, No. 9, May 1, 2019, 10 pages.

\* cited by examiner

DIFFERENTIAL DIFFERENCING TRANSIMPEDANCE AMPLIFIER FOR COHERENT APPLICATIONS

TECHNICAL FIELD

The present disclosure relates to improving the performance of a transimpedance amplifier (TIA) for coherent applications.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

As such, optical communication systems have been widely adopted for applications ranging from internet backbone, local area networks, data centers, supercomputing, to high-definition video. Due to superior bandwidth and low loss, optical fibers are the medium of choice for transporting high-speed binary data.

A transimpedance amplifier (TIA) is a critical functional block for an optical receiver to convert optical signal/current into voltage for data processing. Traditionally, a differential TIA architecture is used for coherent links to detect different modulation signals such as QPSK, QAM-16, QAM-32, etc. The detection capabilities are typically limited by the TIA noise in the receive (RX) chain. As data rate and bandwidth requirements for such systems increase, effective TIA noise also tends to increase in the link, resulting in limited signal-to-noise ratio (SNR), an increase in power consumption, and reduced reach of the link.

DESCRIPTION OF EXAMPLE EMBODIMENTS

Overview

Figure 1:
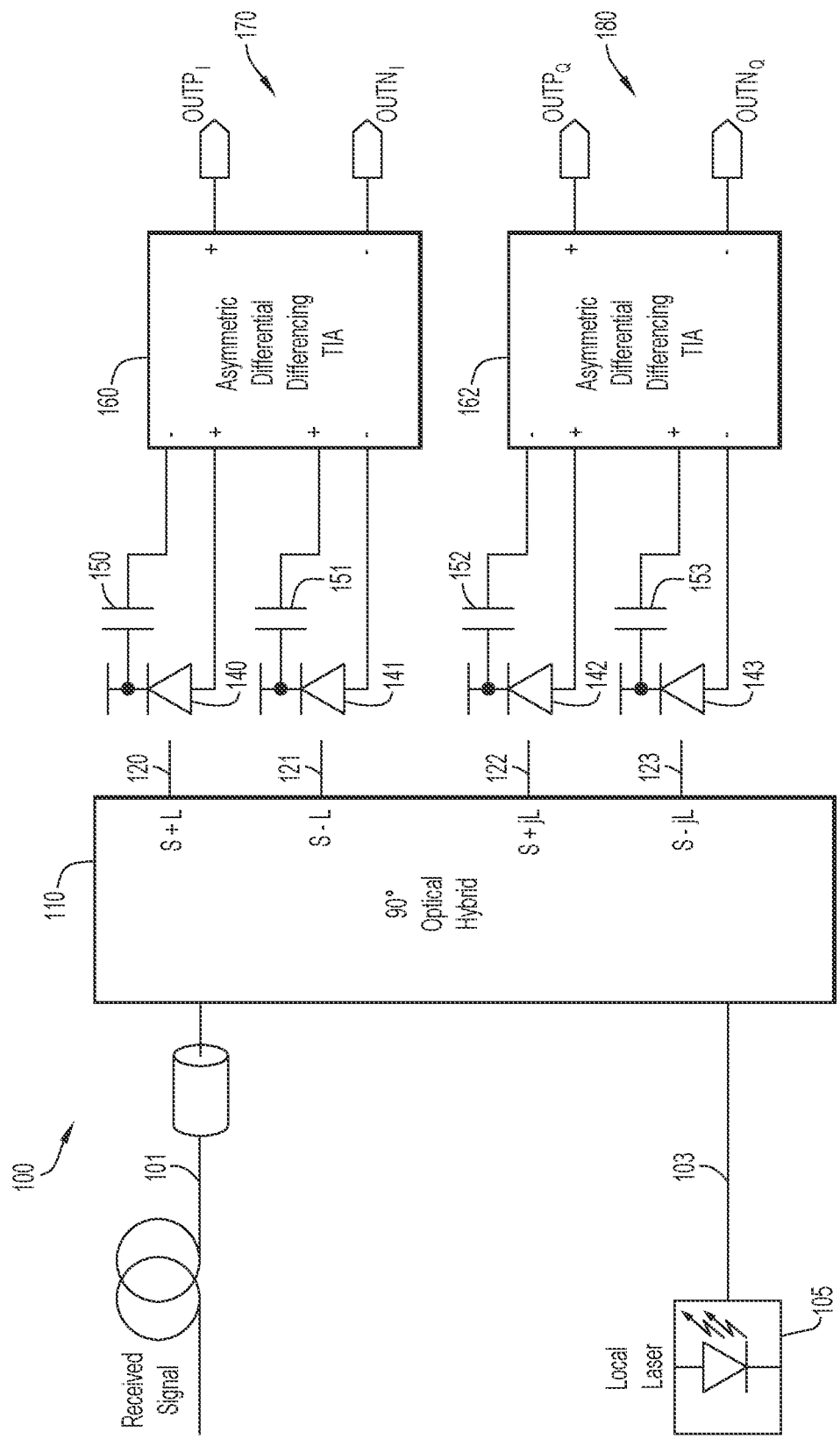
FIG. 1 is a block diagram of a coherent optical receiver including an asymmetric differential differencing transimpedance amplifier, according to an example embodiment.

Presented herein are techniques for implementing a differential differencing transimpedance amplifier (TIA) for coherent applications. A method includes receiving a first optical signal and a second optical signal from a 90 degree optical hybrid that receives a coherent optical signal, wherein the first optical signal and the second optical signal each comprises one pair of sum and difference signals output by the 90 degree optical hybrid, generating, based on the first optical signal and from a first photo diode, a first differential signal, generating, based on the second optical signal and from a second photo diode, a second differential signal, differentially transconducting the first differential signal to produce a first transconducted signal, differentially transconducting the second differential signal to produce a second transconducted signal, performing a differencing operation on the first differential transconducted signal and the second differential transconducted signal to produce a combined differential-differencing transconducted signal that is representative of the first optical signal and the second optical signal, and outputting the combined differential-differencing transconducted signal as a differential output.

In another embodiment, a device is provided. The device includes a 90 degree optical hybrid configured to receive a coherent optical signal and output a first optical signal and a second optical signal, wherein the first optical signal and the second optical signal comprise one pair of sum and difference signals output by the 90 degree optical hybrid, a first photo diode configured to generate, from the first optical signal, a first differential signal, a second photo diode configured to generate, from the second optical signal, a second differential signal and a differential-differencing programmable gain amplifier configured to: receive the first differential signal and the second differential signal, transconduct the first differential signal and the second differential signal, to produce a first transconducted signal and a second transconducted signal, perform a differencing operation on the first differential transconducted signal and the second differential transconducted signal to produce a combined differential-differencing transconducted signal that is representative of the first optical signal and the second optical signal, and output the combined differential-differencing transconducted signal as a differential output.

In still another embodiment a device includes a 90 degree optical hybrid configured to receive a coherent optical signal and output a first pair of sum and difference optical signals and a second pair sum and difference optical signals, a first pair of photo diodes configured to generate, from the first pair of sum and difference optical signals, a first differential signal and a second differential signal, a second pair of photo diodes configured to generate, from the second pair of sum and difference signals, a third differential signal and a fourth differential signal, a first asymmetric differential differencing transconductance amplifier configured to receive the first differential signal and the second differential signal and to output a first transconducted differential signal, and a second asymmetric differential differencing transconductance amplifier configured to receive the third differential signal and the fourth differential signal and to output a second transconducted differential signal.

Example Embodiments

Described herein is a unique approach to implementing a differential differencing transimpedance amplifier (TIA) for a coherent optical receiver. In one embodiment, asymmetric paths from a photo diode or photo detector are used to provide better frequency response and lower noise. This approach can improve the optical receiver SNR and link margin by up to 3 dB compared to a conventional differential TIA used in a coherent optical receiver. More specifically, an asymmetric signal path approach is used to extract differential signal out of the photo diodes of the TIA. A differential differencing amplifier stage is then used to add the TIA signals from two differential frontend paths. An optical receiver that implements this approach can help to extend the range of a link for a given system power consumption, and/or can help to decrease transmitter power for a given range.

Reference is now made to the figures, beginning with FIG. 1, which is a block diagram of a coherent optical receiver 100 including an asymmetric differential differencing transimpedance amplifier 160, according to an example embodiment. As shown, a 90° optical hybrid 110 receives a coherent optical signal 101 including two polarization states, and a local laser signal 103 from local laser 105. The 90° optical hybrid 110 generates sum and difference quadrature signals S+L 120, S-L 121, S+jL 122, and S-jL 123, which are projected, respectively, onto photo diodes 140, 141, 142, 143. A differential current signal is then generated by, and supplied from, each of the photo diodes 140, 141, 142, 143 to asymmetric differential differencing TIA 160 and asymmetric differential differencing TIA 162, which output in-phase and quadrature differential signals including an output 170 comprising OUTP$_I$, OUTN$_I$, and an output 180 comprising OUTP$_Q$, OUTN$_Q$. As shown in FIG. 1, capacitors 150, 151, 152, 153 are interposed between the cathode end of each of the photo diodes 140, 141, 142, 143 and asymmetric differential differencing TIAs 160, 162. In this embodiment, the anode ends of the photo diodes 140, 141, 142, 143 are not capacitively coupled (i.e., there is no blocking capacitor in the lines) to the asymmetric differential differencing TIAs 160, 162, resulting in sending signals via an asymmetric differential signal path on the lines from each of the photo diodes 140, 141, 142, 143.

Figure 2:
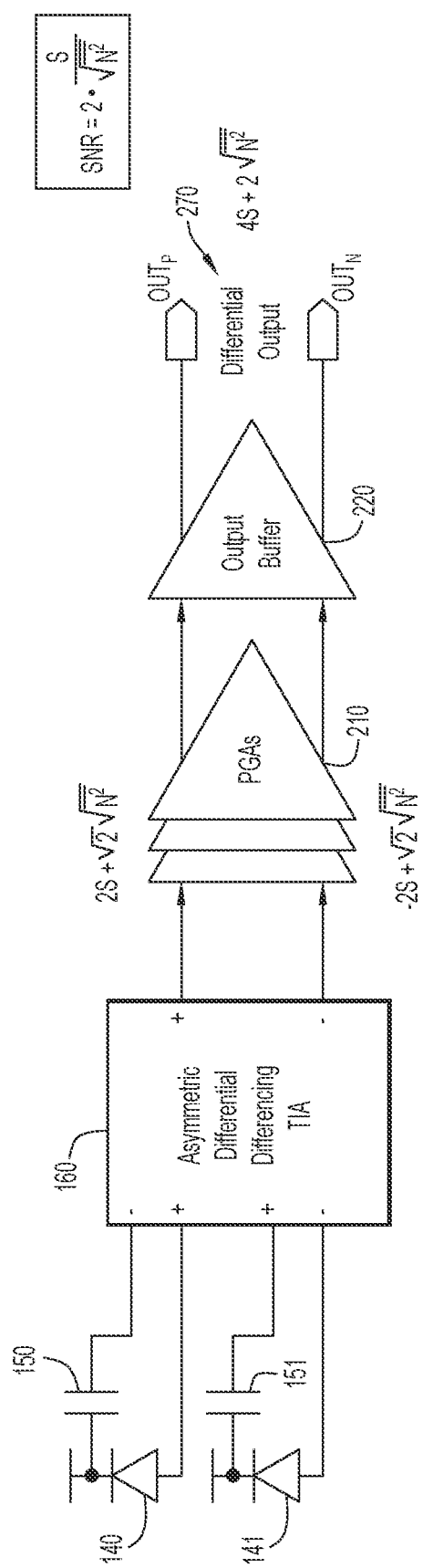
FIG. 2 is a block diagram of additional components associated with, e.g., an asymmetric differential differencing TIA, according to an example embodiment.

FIG. 2 is a block diagram of additional components associated with, e.g., the asymmetric differential differencing TIA 160, according to an example embodiment. Asymmetric differential differencing TIA 162 (FIG. 1) would be implemented in the same way. As shown, photo diodes 140, 141 supply an asymmetric differential signal, via capacitors 150, 151, to asymmetric differential differencing TIA 160, whose output is supplied to programmable gain amplifiers 210. An output of programmable gain amplifiers 210 is supplied to output buffer 220, which outputs differential output 270 comprising (more generally) OUT$_P$, OUT$_N$. The asymmetric transimpedance front-end (see FIG. 3 for more detail) uses capacitive coupling (a DC blocking capacitor) to enable the use of the cathode node in addition to the conventional DC coupled anode node of photo diodes 140, 141. With this arrangement, the output 270 may be represented by $$4S + 2\sqrt{N^2},$$

with S for signal, and N for noise.

The signal to noise ratio may be represented by $$SNR = 2 \cdot S / \sqrt{N^2}.$$

It should be noted that in a conventional coherent TIA this output would only be $$\sqrt{2} \cdot S / \sqrt{N^2}$$

resulting in the asymmetric differential differencing TIA having 3 dB better SNR than a conventional differential coherent TIA.

Figure 3:
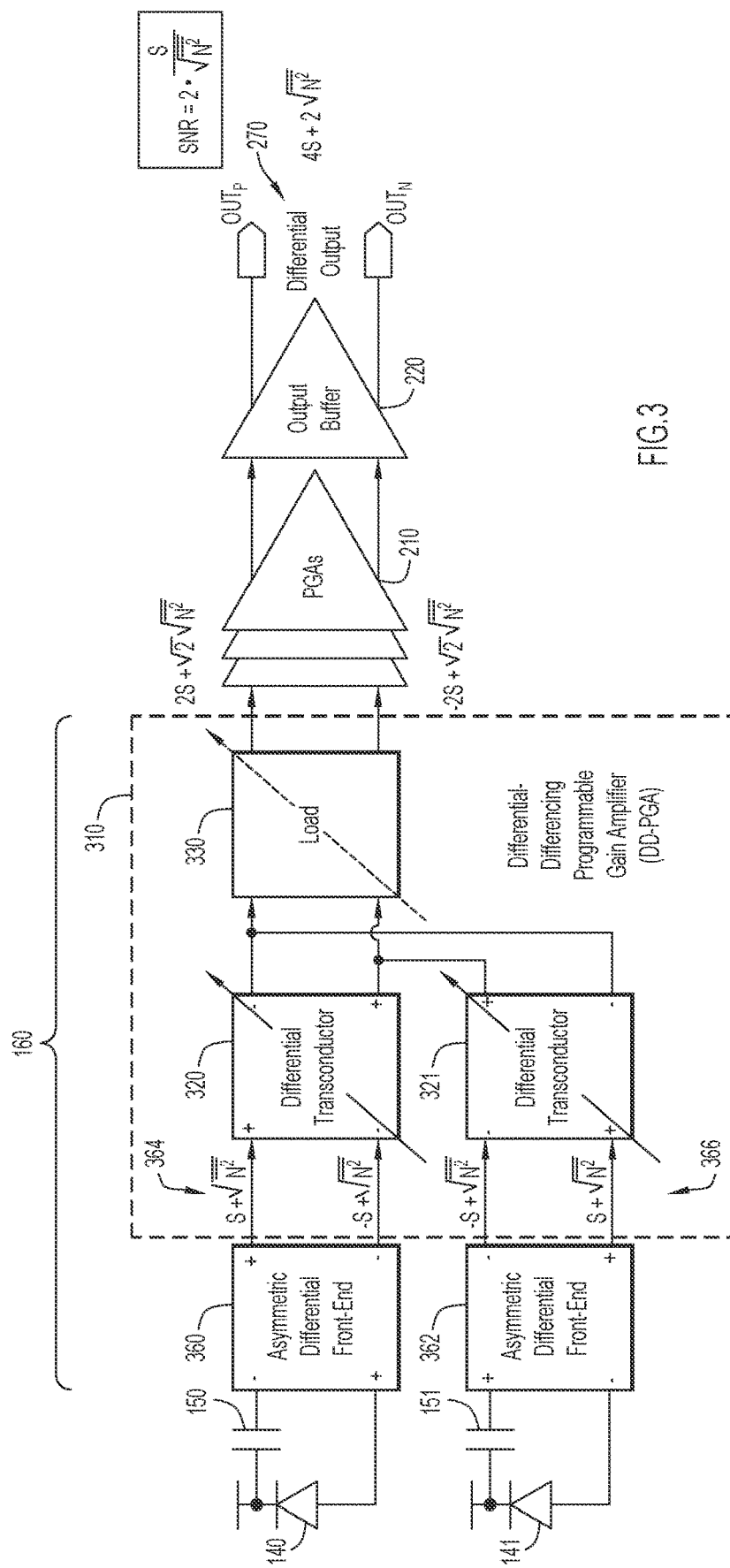
FIG. 3 is a block diagram of further details of the asymmetric differential differencing transimpedance amplifier, according to an example embodiment.

FIG. 3 is a block diagram of further details of asymmetric differential differencing transimpedance amplifier 160, according to an example embodiment. As shown, photo diodes 140, 141 supply asymmetric differential signals, via capacitors 150, 151, to asymmetric differential differencing TIA 160, which comprises asymmetric differential front-end 360 and asymmetric differential front-end 362, which output differential signals 364, 366. Differential signals 364, 366 are fed to differential-differencing programmable gain amplifier (DD-PGA) 310, which comprises adjustable differential transconductors 320, 321, whose outputs are combined, and then fed to an adjustable load 330. Differential-differencing programmable gain amplifier (DD-PGA) 310 supplies its output to PGAs 210, whose output is supplied to output buffer 220, which outputs differential output 270 comprising (more generally) OUT$_P$, OUT$_N$, as also shown in FIG. 2. Due to the differential differencing configuration, the signal amplitude of output 270 increases by 6 dB, while, due to its random nature, the noise only increases by 3 dB.

Thus, the implementation of the illustrated embodiment provides a theoretical 3 dB SNR improvement over conventional TIAs in coherent applications.

Figure 4:
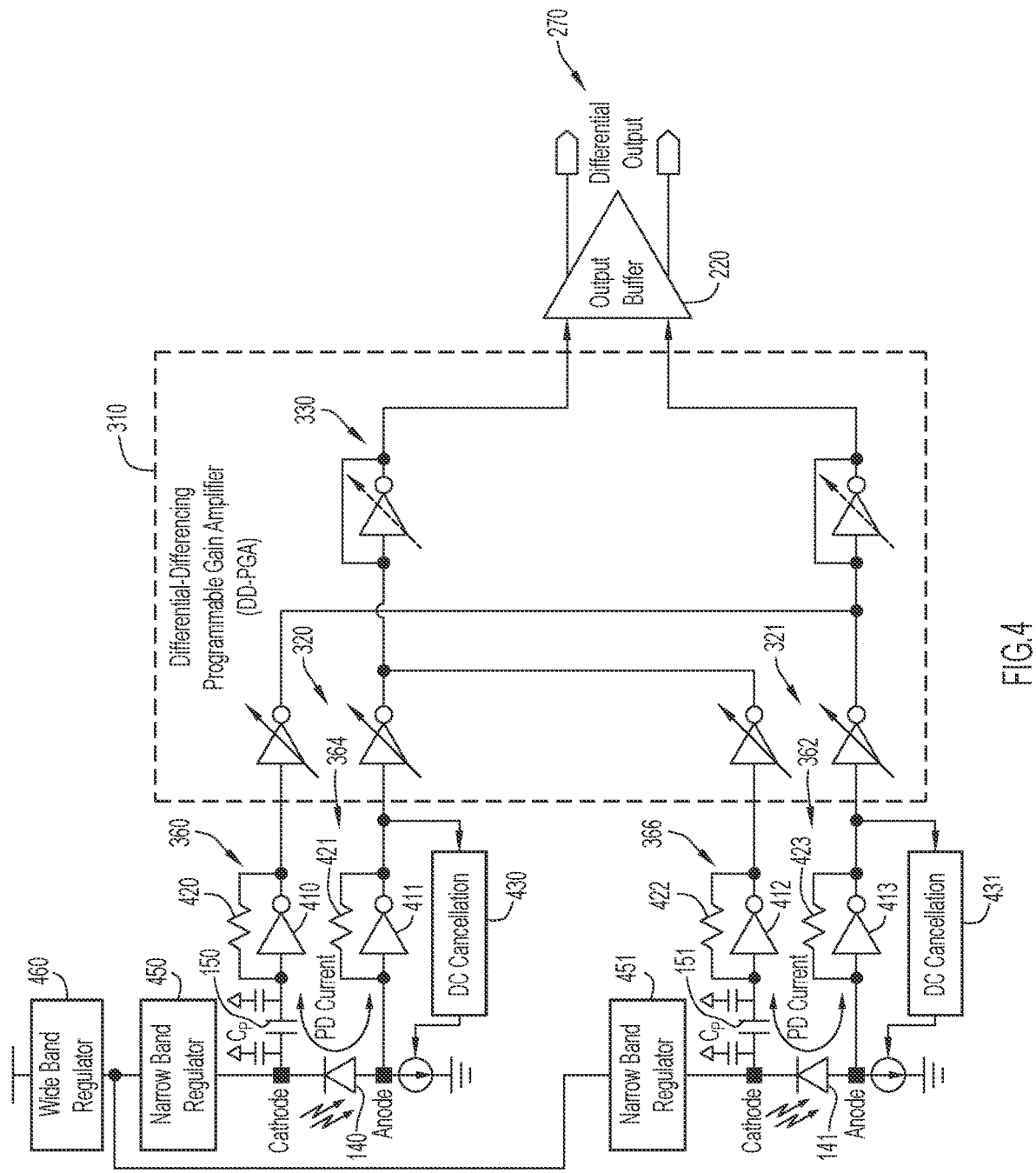
FIG. 4 is a block diagram of a CMOS implementation of a coherent optical receiver frontend including an asymmetric differential differencing transimpedance amplifier, and showing narrow and wide band voltage regulators, according to an example embodiment.

FIG. 4 is a block diagram of a CMOS implementation of a coherent optical receiver frontend including an asymmetric differential differencing transimpedance amplifier, and showing narrow and wide band voltage regulators, according to an example embodiment. As shown, photo diodes 140, 141 supply differential signals, via capacitors 150, 151, to, respectively, asymmetric differential front-end 360 and asymmetric differential front-end 362. Asymmetric differential front-end 360 comprises inverters 410, 411 in parallel with resistors 420, 421. A DC cancellation circuit 430 is further provided to remove DC bias current since there is no blocking capacitor in the line associated with the anode of photo diode 140, such as capacitor 150 in the line associated with the cathode of photo diode 140. DC cancellation circuit 430 improves dynamic range of the circuit.

Similarly, asymmetric differential front-end 362 comprises inverters 412, 413 in parallel with resistors 422, 423. A DC cancellation circuit 431 is further provided to remove DC bias current since there is no blocking capacitor in the line associated with the anode of photo diode 141.

In the depicted embodiment, a wideband regulator 460 supplies power to narrow band regulators 450, 451, which respectively supply power to photo diodes 140, 141. Narrow band regulators 450, 451 provide frequency dependent high impedance at the cathode of photo diodes 140, 141, and wideband regulator 460 provides power supply noise rejection.

Asymmetric differential front-end 360 and asymmetric differential front-end 362 output differential signals 364, 366, which are fed to DD-PGA 310, which comprises adjustable differential transconductors 320, 321, whose outputs are combined, and then fed to an adjustable load 330. As shown, adjustable differential transconductors 320, 321 and adjustable load 330 may be inverter based. The implementation of DD-PGA 310 helps to maintain linearity and increases signal level.

DD-PGA 310 supplies its output optionally to, e.g., PGAs 210 (not shown in FIG. 4), whose output is supplied to output buffer 220, which outputs differential output 170 comprising OUT$_P$, OUT$_N$, as also shown in FIGS. 2 and 3. Due to the differential differencing configuration, the signal amplitude of output 270 increases by 6 dB, while, due to its random nature, the noise only increases by 3 dB.

Figure 5:
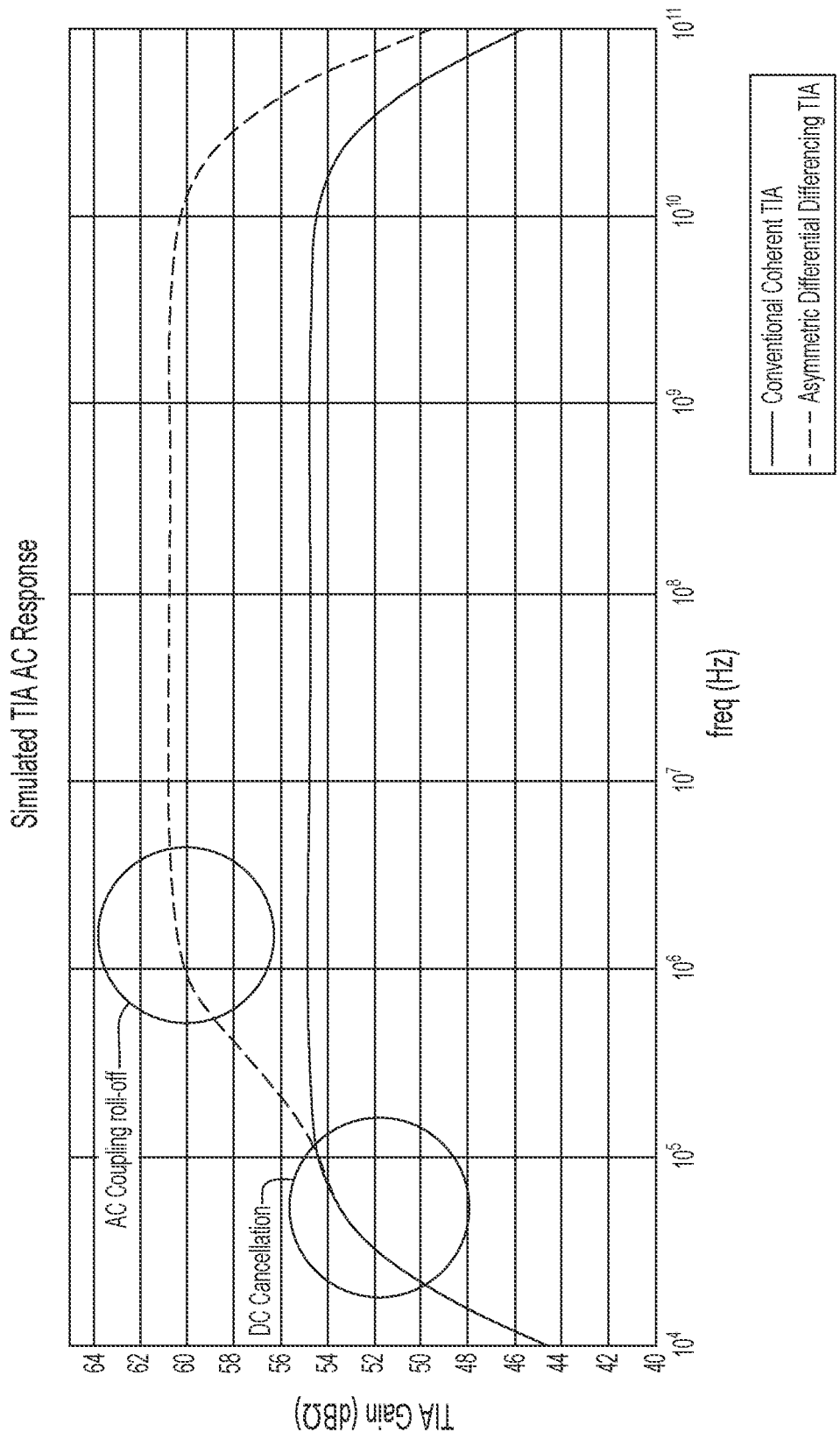
FIG. 5 is a graph comparing the performance of a conventional coherent differential transimpedance amplifier versus the asymmetric differential differencing transimpedance amplifier, according to an example embodiment.

FIG. 5 is a graph comparing the performance of a conventional transimpedance amplifier versus the asymmetric differential differencing transimpedance amplifier, according to an example embodiment. As shown, a 6 dB increase in gain is achieved with the asymmetric differential differencing TIA disclosed herein. Due to the blocking capacitors 150, 151, 152, 153 low frequency signals are attenuated. As further shown, the DC coupled signal path dictates the rest of the low-frequency behavior. The overall high-frequency bandwidth is also higher compared to a symmetric path differential differencing TIA.

A mostly similar, but alternative embodiment, is described next in connection with FIGS. 6-9. In this alternative embodiment, symmetric ac-coupled differential paths are employed between the photo diodes.

Figure 6:
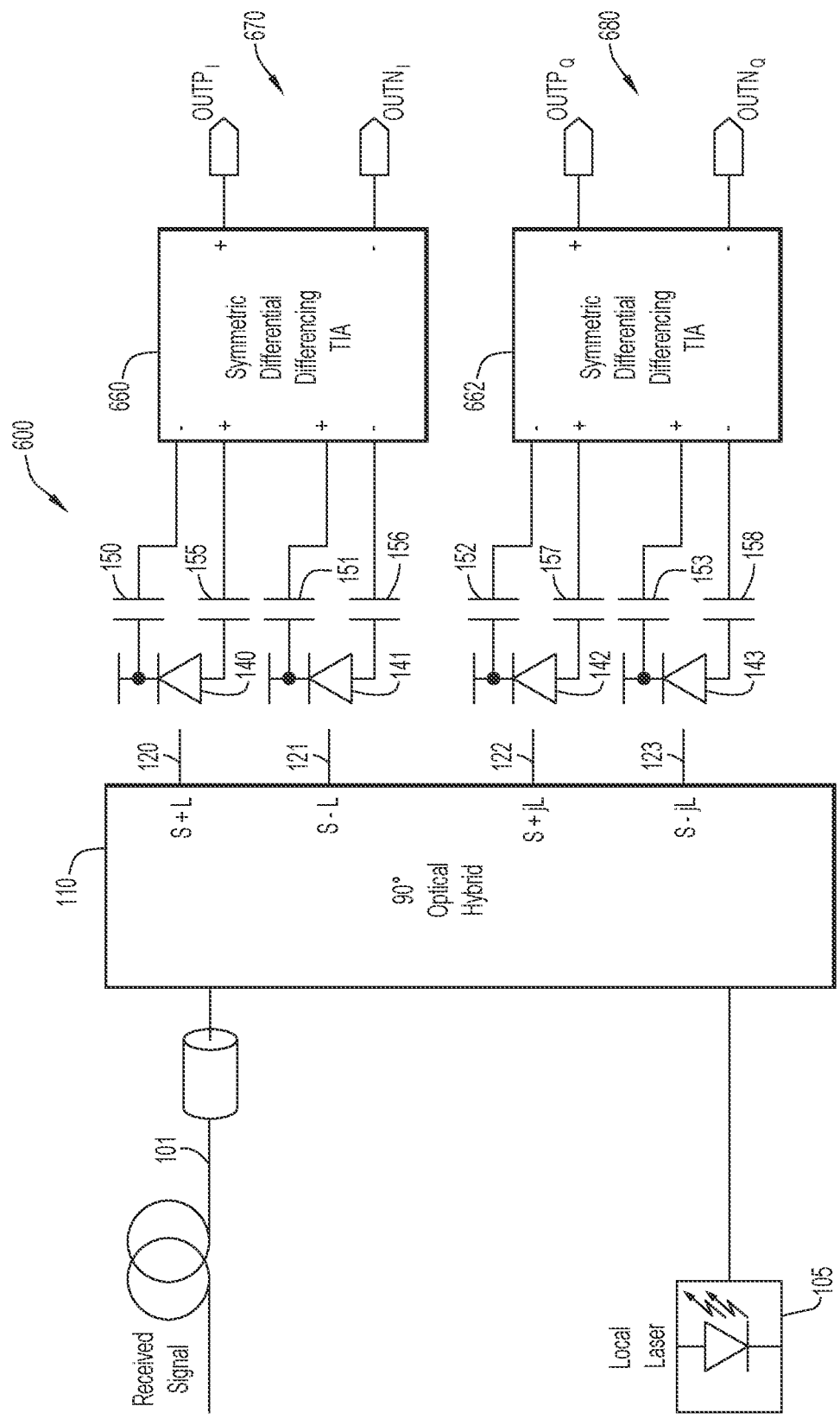
FIG. 6 is a block diagram of a coherent optical receiver including a symmetric differential differencing transimpedance amplifier, according to an example embodiment.

FIG. 6 is a block diagram of a coherent optical receiver including a symmetric differential differencing transimpedance amplifier, according to an example embodiment. As shown, a 90° optical hybrid 110 receives a coherent optical signal 101, and a local laser signal 103 from local laser 105. The 90° optical hybrid 110 generates sum and difference quadrature signals S+L 120, S-L 121, S+jL 122, and S-jL 123, which are projected, respectively, onto photo diodes 140, 141, 142, 143. A differential current signal is then generated by, and supplied from, each of the photo diodes 140, 141, 142, 143 to symmetric differential differencing TIA 660 and symmetric differential differencing TIA 662, which output in-phase and quadrature differential signals including an output 670 comprising OUTP$_I$, OUTN$_I$, and an output 680 comprising OUTP$_Q$, OUTN$_Q$. As shown in FIG. 1, capacitors 150, 151, 152, 153, 155, 156, 157, 158 are interposed on the lines between the cathode and anode ends of each of the photo diodes 140, 141, 142, 143 and symmetric differential differencing TIAs 660, 662. In this embodiment, both the anode ends and the cathode ends of the photo diodes 140, 141, 142, 143 are capacitively coupled to the symmetric differential differencing TIAs 660, 662, resulting in a symmetric differential signal path on both lines from each of the photo diodes 140, 141, 142, 143.

Figure 7:
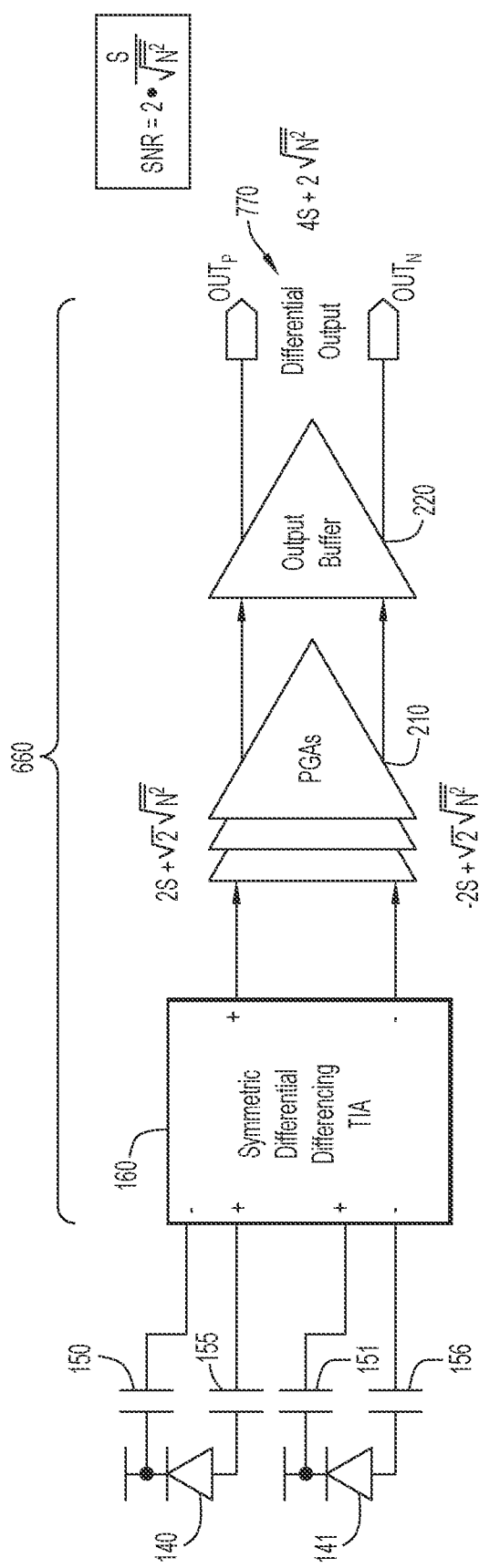
FIG. 7 is a block diagram of a portion of the symmetric differential differencing transimpedance amplifier, according to an example embodiment.

FIG. 7 is a block diagram of a portion of symmetric differential differencing transimpedance amplifier 660, according to an example embodiment. Symmetric differential differencing TIA 162 (FIG. 6) would be implemented in the same way. As shown, photo diodes 140, 141 supply a symmetric differential signal, via capacitors 150, 151, 155, 156 to symmetric differential differencing TIA 660, whose output is supplied to programmable gain amplifiers 210. An output of programmable gain amplifiers 210 is supplied to output buffer 220, which outputs differential output 670 comprising (more generally) OUT$_P$, OUT$_N$. The symmetric transimpedance front-end (see FIG. 8 for more detail) uses capacitive coupling to both the anode and the cathode of photo diodes 140, 141. With this arrangement, the output 270 may be represented by $$4S + 2\sqrt{N^2},$$

with S for signal, and N for noise.

The signal to noise ratio may be represented by $$SNR = 2 \cdot S/\sqrt{N^2}.$$

It should be noted that in the conventional coherent TIA this output would only be $$\sqrt{2} \cdot S/\sqrt{N^2}$$

resulting in the symmetric differential differencing TIA having 3 dB better SNR than conventional differential coherent TIA.

Figure 8:
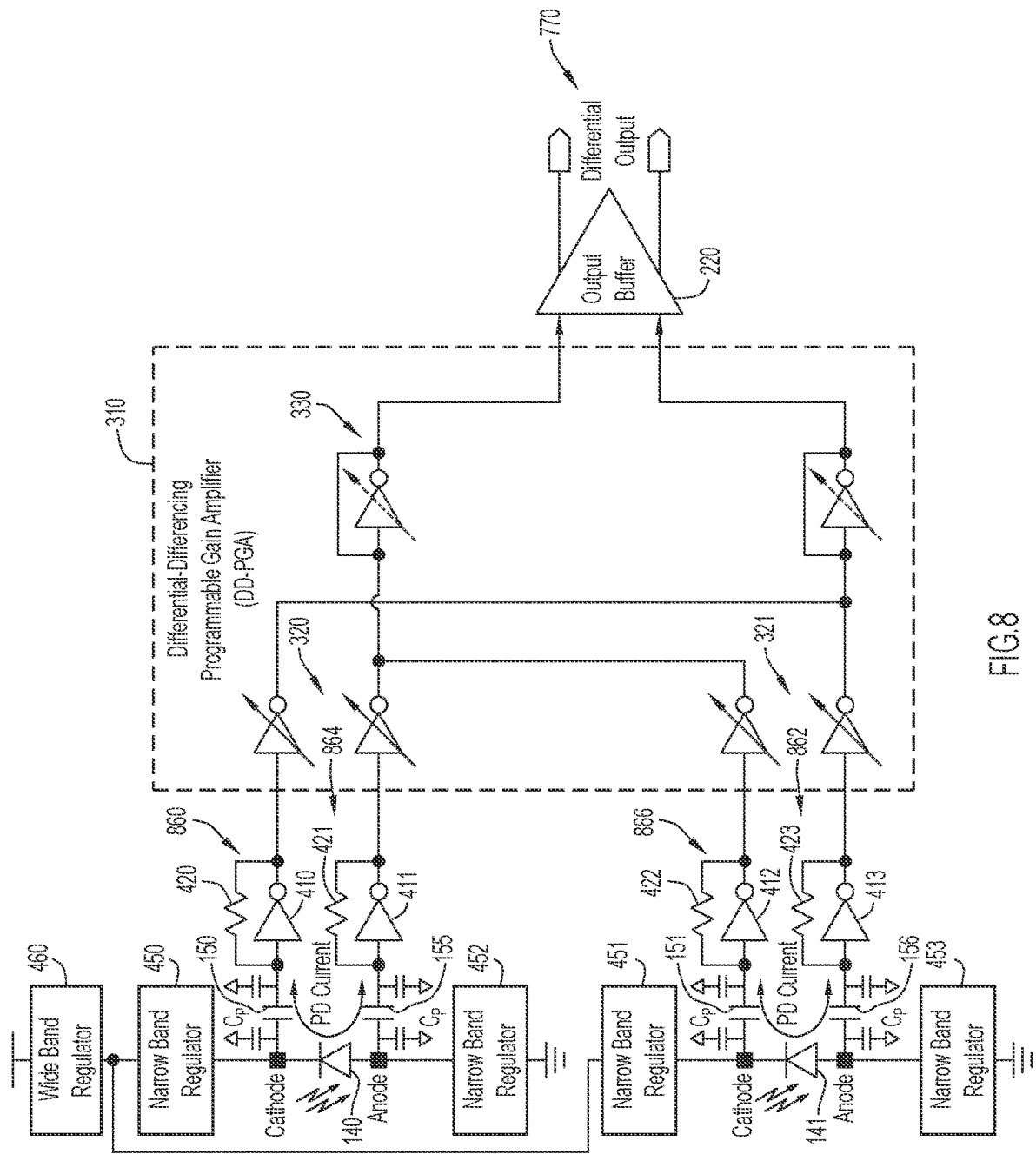
FIG. 8 is a block diagram of a CMOS implementation of a coherent optical receiver frontend including a symmetric differential differencing transimpedance amplifier, and showing narrow and wide band voltage regulators, according to an example embodiment.

FIG. 8 is a block diagram of a portion of a coherent optical receiver including a symmetric differential differencing transimpedance amplifier, and showing narrow and wide band voltage regulators, according to an example embodiment. As shown, photo diodes 140, 141 supply symmetric differential signals, via capacitors 150, 151, 155, 156 to, respectively, symmetric differential front-end 860 and symmetric differential front-end 862. Symmetric differential front-end 860 comprises inverters 410, 411 in parallel with resistors 420, 421. No DC cancellation circuit is needed since both lines of the differential path includes capacitors 150, 151, 155, 156 to block DC current.

Similarly, symmetric differential front-end 862 comprises inverters 412, 413 in parallel with resistors 422, 423.

In the depicted embodiment, a wideband regulator 460 supplies power to narrow band regulators 450, 451, 452, 453, which respectively supply power to photo diodes 140, 141. Narrow band regulators 450, 451, 452, 453 provide frequency dependent high impedance at the cathode of photo diodes 140, 141, and wideband regulator 460 provides power supply noise rejection.

Symmetric differential front-end 860 and symmetric differential front-end 862 output differential signals 864, 866, which are fed to DD-PGA 310, which comprises adjustable differential transconductors 320, 321, whose outputs are combined, and then fed to an adjustable load 330. As shown, adjustable differential transconductors 320, 321 and adjustable load 330 may be inverter based. The implementation of DD-PGA 310 helps to maintain linearity and increases signal level.

DD-PGA 310 supplies its output optionally to, e.g. PGAs 210 (not shown in FIG. 8), whose output is supplied to output buffer 220, which outputs differential output 770 comprising $OUT_P$, $OUT_N$, as also shown in FIG. 7. Due to the differential differencing configuration, the signal amplitude of output 770 increases by 6 dB, while, due to its random nature, the noise only increases by 3 dB.

Figure 9:
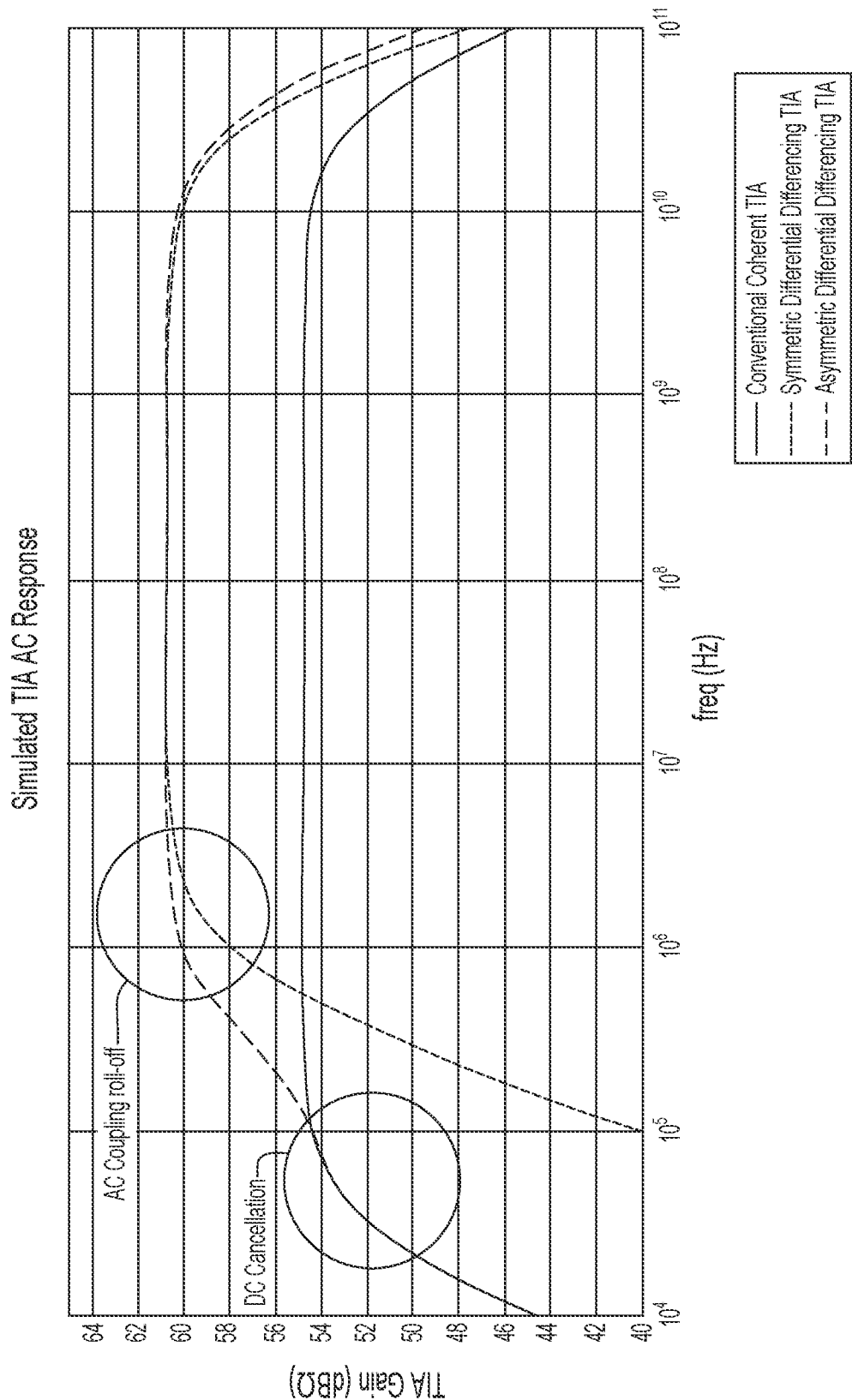
FIG. 9 is a graph comparing the performance of a conventional coherent differential transimpedance amplifier versus the asymmetric differential differencing transimpedance amplifier and the symmetric differential differencing transimpedance amplifier, according to an example embodiment.

FIG. 9 is a graph comparing the performance of a conventional transimpedance amplifier versus the asymmetric differential differencing transimpedance amplifier and the symmetric differential differencing transimpedance amplifier, according to an example embodiment. The symmetric embodiment also provides 6 dB higher signal path gain due to the differential nature of the path. The low-frequency corner is also similar to the asymmetric embodiment and is dictated by capacitor size. As can be further seen from the graph, with the symmetric embodiment, low-frequency data may suffer from attenuation, leading to baseline wander. And, the overall TIA bandwidth is reduced due to larger parasitic effects caused by increased capacitance.

Figure 10:
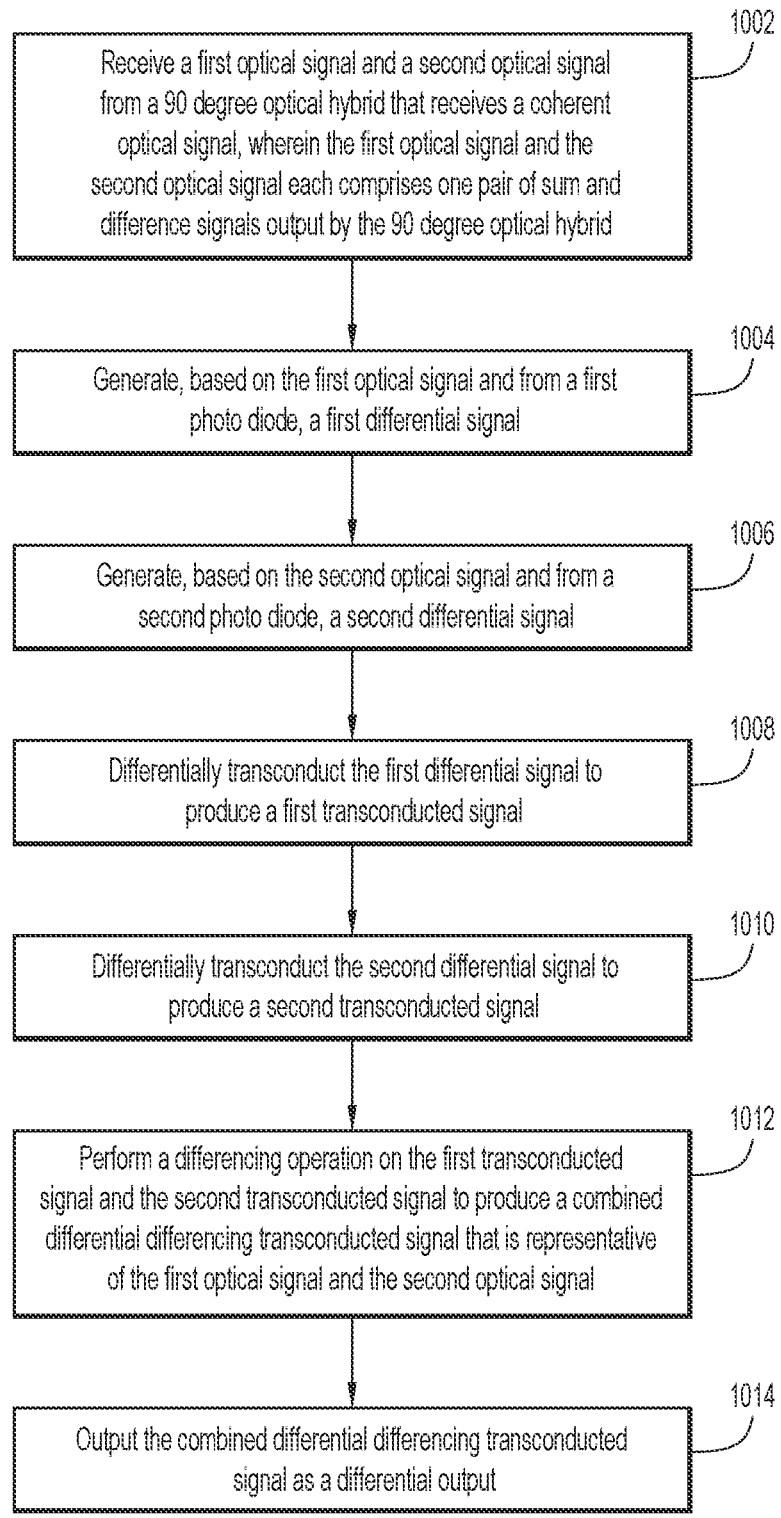
FIG. 10 is a flow chart showing a series of operations for operating an asymmetric or symmetric differential differencing transimpedance amplifier for a coherent optical receiver, according to an example embodiment.

FIG. 10 is a flow chart showing a series of operations for operating an asymmetric or symmetric differential differencing transimpedance amplifier for a coherent optical receiver, according to an example embodiment. At 1002 an operation is configured to receiving a first optical signal and a second optical signal from a 90 degree optical hybrid that receives a coherent optical signal, wherein the first optical signal and the second optical signal each comprises one pair of sum and difference signals output by the 90 degree optical hybrid. At 1004, an operation is configured to generate, based on the first optical signal and from a first photo diode, a first differential signal. At 1006, an operation is configured to generate, based on the second optical signal and from a second photo diode, a second differential signal. At 1008, an operation is configured to differentially transconduct the first differential signal to produce a first transconducted signal. At 1010, an operation is configured to differentially transconduct the second differential signal to produce a second transconducted signal. At 1012, an operation is configured to combine the first transconducted signal with the second transconducted signal to produce a combined differential transconducted signal that is representative of the first optical signal and the second optical signal. And, at 1014, an operation is configured to output the combined differential transconducted signal as a differential output.

Figure 11:
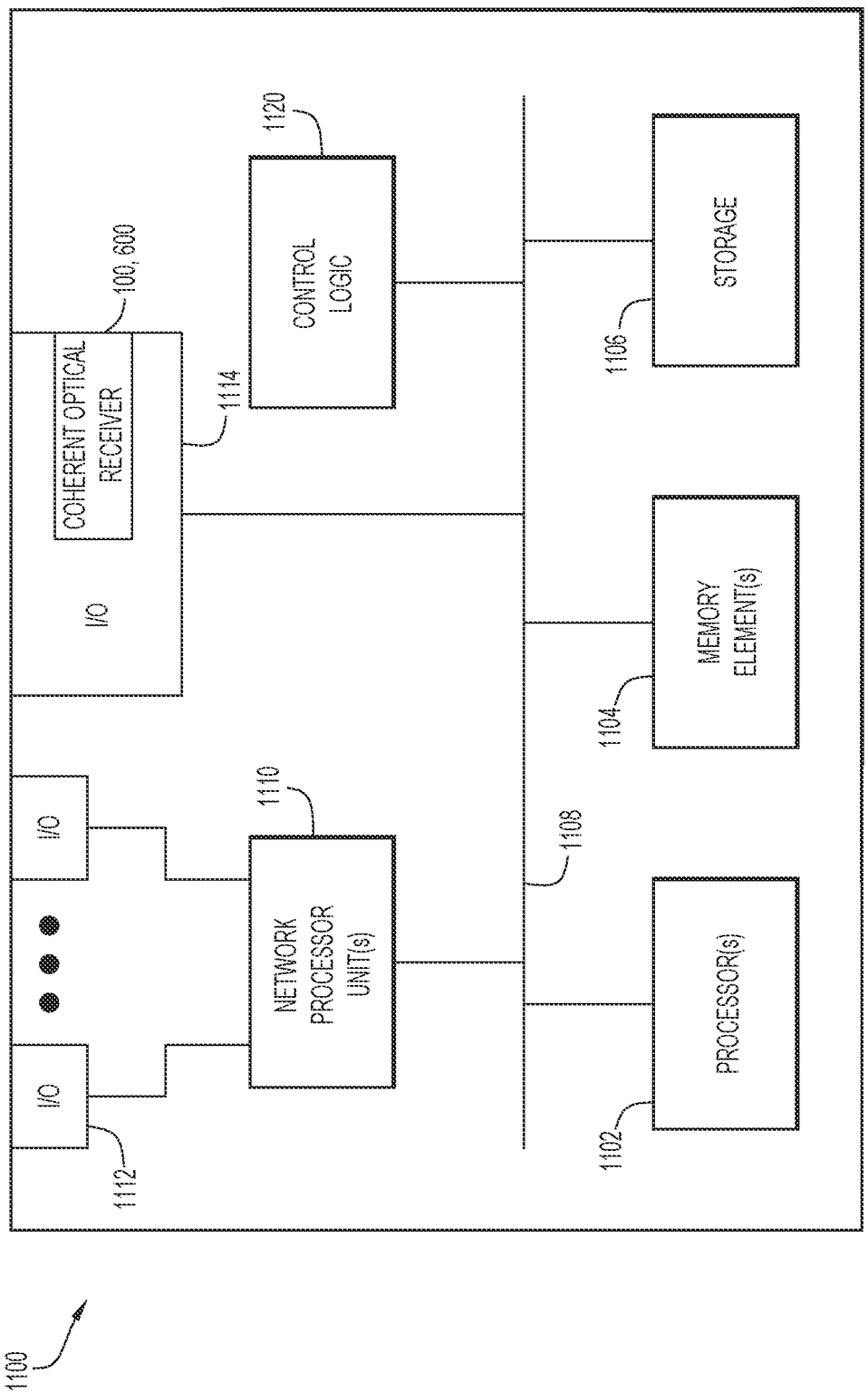
FIG. 11 is a block diagram of a device that may be configured to include a coherent optical receiver including an asymmetric or symmetric differential differencing transimpedance amplifier, according to an example embodiment.

FIG. 11 is a block diagram of a device 1100 that may be configured to include a coherent optical receiver 100, 600 including an asymmetric or symmetric differential differencing transimpedance amplifier, according to an example embodiment. In at least one embodiment, the computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory element(s) 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 (wired and/or wireless) to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, any other I/O port(s), and/or antenna(s)/antenna array(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory element(s) 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment, a method is provided. The method may include receiving a first optical signal and a second optical signal from a 90 degree optical hybrid that receives a coherent optical signal, wherein the first optical signal and the second optical signal each comprises one pair of sum and difference signals output by the 90 degree optical hybrid, generating, based on the first optical signal and from a first photo diode, a first differential signal, generating, based on the second optical signal and from a second photo diode, a second differential signal, differentially transconducting the first differential signal to produce a first differential transconducted signal, differentially transconducting the second differential signal to produce a second differential transconducted signal, performing a differencing operation on the first differential transconducted signal and the second differential transconducted signal to produce a combined differential-differencing transconducted signal that is representative of the first optical signal and the second optical signal, and outputting the combined differential-differencing transconducted signal as a differential output.

The method may further include supplying power to the first photo diode and to the second photo diode with a wideband regulator.

The method may also include supplying power to a cathode of the first photo diode with a first narrow band regulator and a cathode of the second photo diode with a second narrow band regulator.

The method may include sending the first differential signal and the second differential signal via an asymmetric path.

The method may also include passing only one line of the first differential signal through a first blocking capacitor and one line of the second differential signal through a second blocking capacitor.

The method may include, using a DC current cancellation block, removing a DC component of photo detector current on at least one line of at least one of the first differential signal and the second differential signal.

The method may further include sending the first differential signal and the second differential signal via a symmetric path.

In the method, the first optical signal and the second optical signal may represent one polarization state of two polarized optical signals in the coherent optical signal.

In the method, performing the differencing operation may include passing the first differential transconducted signal and the second differential transconducted signal through at least one programmable gain amplifier.

The method may also include passing an output of the at least one programmable gain amplifier through a buffer.

In another embodiment, a device is provided. The device may include a 90 degree optical hybrid configured to receive a coherent optical signal and output a first optical signal and a second optical signal, wherein the first optical signal and the second optical signal comprise one pair of sum and difference signals output by the 90 degree optical hybrid, a first photo diode configured to generate, from the first optical signal, a first differential signal, a second photo diode configured to generate, from the second optical signal, a second differential signal, and a differential-differencing programmable gain amplifier configured to: receive the first differential signal and the second differential signal, transconduct the first differential signal and the second differential signal, to produce a first differential transconducted signal and a second differential transconducted signal, perform a differencing operation on the first differential transconducted signal and the second differential transconducted signal to produce a combined differential-differencing transconducted signal that is representative of the first optical signal and the second optical signal, and output the combined differential-differencing transconducted signal as a differential output.

The device may include a wideband regulator that is configured to supply power to the first photo diode and to the second photo diode.

The device may also include a first narrow band regulator that is configured to supply power to a cathode of the first photo diode and a second narrow band regulator that is configured to supply power to a cathode of the second photo diode.

In an implementation of the device, a first path between the first photo diode and the differential-differencing programmable gain amplifier and a second path between the second photo diode and the differential-differencing programmable gain amplifier are asymmetric.

The device may also include a first blocking capacitor disposed on only one line of the first differential signal and a second blocking capacitor disposed on only one line of the second differential signal.

The device may further include a DC cancellation circuit on at least one line of at least one of the first differential signal and the second differential signal.

In an implementation, a first path between the first photo diode and the differential-differencing programmable gain amplifier and a second path between the second photo diode and the differential-differencing programmable gain amplifier are symmetric.

In still another embodiment, another device is provided. The device may include a 90 degree optical hybrid configured to receive a coherent optical signal and output a first pair of sum and difference optical signals and a second pair sum and difference optical signals, a first pair of photo diodes configured to generate, from the first pair of sum and difference optical signals, a first differential signal and a second differential signal, a second pair of photo diodes configured to generate, from the second pair of sum and difference signals, a third differential signal and a fourth differential signal, a first asymmetric differential differencing transconductance amplifier configured to receive the first differential signal and the second differential signal and to output a first transconducted differential signal, and a second asymmetric differential differencing transconductance amplifier configured to receive the third differential signal and the fourth differential signal and to output a second transconducted differential signal.

In an implementation of the device, the first asymmetric differential differencing transconductance amplifier may include a first differential-differencing programmable gain amplifier and the second asymmetric differential differencing transconductance amplifier may include a second differential-differencing programmable gain amplifier.

In an implementation of the device, the first differential-differencing programmable gain amplifier and the second differential-differencing programmable gain amplifier are inverter based.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    receiving a first optical signal and a second optical signal from a 90 degree optical hybrid that receives a coherent optical signal, wherein the first optical signal and the second optical signal each comprises one pair of sum and difference signals output by the 90 degree optical hybrid;
    generating, based on the first optical signal and from a first photo diode, a first differential signal;
    generating, based on the second optical signal and from a second photo diode, a second differential signal;
    differentially transconducting the first differential signal to produce a first differential transconducted signal;
    differentially transconducting the second differential signal to produce a second differential transconducted signal;
    performing a differencing operation on the first differential transconducted signal and the second differential transconducted signal to produce a combined differential-differencing transconducted signal that is representative of the first optical signal and the second optical signal; and
    outputting the combined differential-differencing transconducted signal as a differential output.

2. The method of claim 1, further comprising supplying power to the first photo diode and to the second photo diode with a wideband regulator.

3. The method of claim 2, further comprising supplying power to a cathode of the first photo diode with a first narrow band regulator and a cathode of the second photo diode with a second narrow band regulator.

4. The method of claim 1, further comprising sending the first differential signal and the second differential signal via an asymmetric path.

5. The method of claim 4, further comprising passing only one line of the first differential signal through a first blocking capacitor and one line of the second differential signal through a second blocking capacitor.

6. The method of claim 1, further comprising, using a DC current cancellation block, removing a DC component of photo detector current on at least one line of at least one of the first differential signal and the second differential signal.

7. The method of claim 1, further comprising sending the first differential signal and the second differential signal via a symmetric path.

8. The method of claim 1, wherein the first optical signal and the second optical signal represent one polarization state of two polarized optical signals in the coherent optical signal.

9. The method of claim 1, wherein performing the differencing operation comprises passing the first differential transconducted signal and the second differential transconducted signal through at least one programmable gain amplifier.

10. The method of claim 9, further comprising passing an output of the at least one programmable gain amplifier through a buffer.

11. A device comprising:
- a 90 degree optical hybrid configured to receive a coherent optical signal and output a first optical signal and a second optical signal, wherein the first optical signal and the second optical signal comprise one pair of sum and difference signals output by the 90 degree optical hybrid;
- a first photo diode configured to generate, from the first optical signal, a first differential signal;
- a second photo diode configured to generate, from the second optical signal, a second differential signal; and
- a differential-differencing programmable gain amplifier configured to:
  - receive the first differential signal and the second differential signal;
  - transconduct the first differential signal and the second differential signal, to produce a first differential transconducted signal and a second differential transconducted signal;
  - perform a differencing operation on the first differential transconducted signal and the second differential transconducted signal to produce a combined differential-differencing transconducted signal that is representative of the first optical signal and the second optical signal; and
  - output the combined differential-differencing transconducted signal as a differential output.

12. The device of claim 11, further comprising a wideband regulator that is configured to supply power to the first photo diode and to the second photo diode.

13. The device of claim 11, further comprising a first narrow band regulator that is configured to supply power to a cathode of the first photo diode and a second narrow band regulator that is configured to supply power to a cathode of the second photo diode.

14. The device of claim 11, wherein a first path between the first photo diode and the differential-differencing programmable gain amplifier and a second path between the second photo diode and the differential-differencing programmable gain amplifier are asymmetric.

15. The device of claim 14, further comprising a first blocking capacitor disposed on only one line of the first differential signal and a second blocking capacitor disposed on only one line of the second differential signal.

16. The device of claim 11, further comprising a DC cancellation circuit on at least one line of at least one of the first differential signal and the second differential signal.

17. The device of claim 11, wherein a first path between the first photo diode and the differential-differencing programmable gain amplifier and a second path between the second photo diode and the differential-differencing programmable gain amplifier are symmetric.

18. A device comprising:
- a 90 degree optical hybrid configured to receive a coherent optical signal and output a first pair of sum and difference optical signals and a second pair of sum and difference optical signals;
- a first pair of photo diodes configured to generate, from the first pair of sum and difference optical signals, a first differential signal and a second differential signal;
- a second pair of photo diodes configured to generate, from the second pair of sum and difference signals, a third differential signal and a fourth differential signal;
- a first asymmetric differential differencing transimpedance amplifier configured to receive the first differential signal and the second differential signal and to output a first transconducted differential signal;
- a second asymmetric differential differencing transimpedance amplifier configured to receive the third differential signal and the fourth differential signal and to output a second transconducted differential signal; and
- a load configured to receive a combined differential-differencing transconducted signal, based on the first transconducted differential signal and the second transconducted differential signal, and to output the combined differential-differencing transconducted signal as a differential output.

19. The device of claim 18, wherein the first asymmetric differential differencing transimpedance amplifier comprises a first differential-differencing programmable gain amplifier and the second asymmetric differential differencing transimpedance amplifier comprises a second differential-differencing programmable gain amplifier.

20. The device of claim 19, wherein the first differential-differencing programmable gain amplifier and the second differential-differencing programmable gain amplifier are inverter based.

* * * * *